Aug. 26, 1947.    C. B. A. PORTER    2,426,522
APPARATUS FOR WINDING HELIXES
Filed Jan. 10, 1945    9 Sheets-Sheet 1

INVENTOR
CHARLES BENJAMIN ALBERT PORTER
HIS ATTY

INVENTOR
CHARLES BENJAMIN ALBERT PORTER
HIS ATTY

Aug. 26, 1947.  C. B. A. PORTER,  2,426,522
APPARATUS FOR WINDING HELIXES
Filed Jan. 10, 1945  9 Sheets-Sheet 9

INVENTOR
CHARLES BENJAMIN ALBERT PORTER
BY
HIS ATTY

Patented Aug. 26, 1947

2,426,522

UNITED STATES PATENT OFFICE 2,426,522

APPARATUS FOR WINDING HELIXES

Charles Benjamin Albert Porter, Hillingdon, England, assignor to Heathway Engineering Company Limited, Hillingdon Heath, England, a company of Great Britain Application January 10, 1945, Serial No. 572,111
In Great Britain January 17, 1944

21 Claims. (Cl. 140—71.5)

1

This invention relates to apparatus adapted to wind a helix of wire onto one or more longitudinal supports to form an electrode structure for an electron discharge tube, the apparatus being of the kind adapted to form a work-piece consisting of a succession of helixes spaced apart along one or more continuous supports which are subsequently cut up to yield separate electrode structures. The invention is concerned with such apparatus which includes a headstock through the hollow spindle of which the supports are drawn by a gripper constrained to rotate in unison with the headstock spindle, while the wire is fed from a non-travelling guide into engagement with the supports and around a former fixed to the end of the spindle nearer to the gripper, the speed of longitudinal movement of the gripper being cyclically varied so as to cause the formation of a succession of helixes of relatively closely pitched turns spaced by lengths over which the turns are omitted or relatively widely spaced and subsequently removed. Apparatus having the features hereinbefore set out will be termed in the following description and claims "apparatus of the kind specified." In such machines it is usual to provide, in association with the headstock, tools which nick the supports at uniform intervals to receive the wire and thereafter swage over the lips of the nicks to retain the turns of the wire securely anchored to the supports.

An object of this invention is to provide apparatus of the kind specified in which the pitch of the helix can be accurately maintained and easily varied by small increments between wide limits while the length of the supports in the intervals between individual helixes can be given any desired value.

A further object is to provide such improved apparatus which is capable of readily producing electrode structures having a non-uniform helix, such as are used for example as control grids in variable-mu valves.

Another object is to provide apparatus which will fulfil either or both of the foregoing objects and which is compact in relation to the length of a work-piece that can be made in each run of the apparatus.

Another object is to provide in apparatus of the kind specified improved means for supporting the nicking and swaging tools.

Another object is to effect automatically longitudinal relative displacement of the nicking and swaging tools simultaneously with the variation in pitch of a non-uniform helix.

Another object is to provide means which will

2 automatically deform one or more of the supports in predetermined positions relative to the helixes, the deformations serving to assist in locating the electrode structure in mica spacers or equivalent elements in an electrode assembly in which the helical grid structure is to be finally incorporated.

Where the gripper is moved longitudinally by a nut engaging a lead screw and the length of the work-piece is not an integral multiple of the pitch of the lead screw, the nut will not register with the lead screw when the gripper is indexed back at the end of one run of the machine in readiness to begin the next run. Consequently the first helix of the work-piece is liable to be inaccurately pitched, and another object of this invention is to overcome this difficulty.

Further objects and advantages of the invention will be apparent from the following description of two embodiments thereof, given by way of example with reference to the accompanying drawings, in which:

Figure 2:
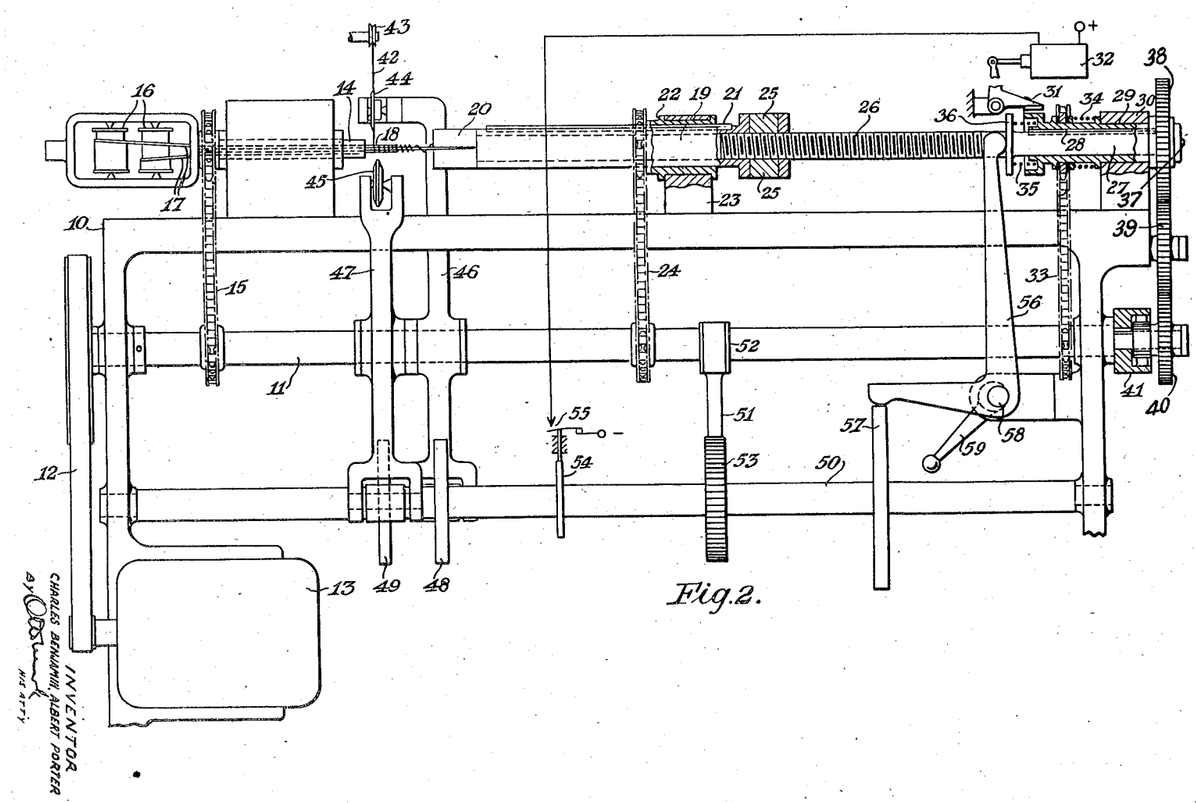
Fig. 2 is a diagrammatic front elevation of an elementary form of the improved apparatus.

The machine shown in Fig. 2 has a frame 10, carrying a common driving member in the form of a lay-shaft 11 extending from end to end of the machine and driven by speed-reducing gearing 12 from a motor 13. A headstock spindle 14 is connected by chain gearing 15 to the lay-shaft 11 and rotates continuously while the machine is in operation, carrying on spools 16 the two lengths of support wire 17 which pass through the spindle 14 and lie respectively in two grooves in a rotating former 18.

A hollow shaft 19 ending in a gripper 20 is coaxial with the headstock spindle and is slidable in, but constrained by a key 21 to rotate with, a bush 22 journalled in a stationary housing 23 and rotated by chain gearing 24 in unison with the headstock spindle 14. The ends of the support wires 17 are fixed to the gripper 20, and a split nut 25 is fixed to the other end of the gripper shaft 20. The bush 22 forms the first input element of a screw-and-nut differential gear.

A lead screw 26 is engaged with the nut 25 and is formed on a shaft 27 which is slidable to a limited extent in, but constrained by a key 28 to rotate with, a sleeve 29 which in turn is rotatable but not slidable in a bearing 30 on the frame 10. The sleeve 29, which forms the second input element of the differential gear, is associated with a brake 31 engageable by a solenoid 32. A chain gearing 33 connects the sleeve 29 to the lay-shaft 11 through a friction clutch loaded by a spring 34, which tends to rotate the sleeve 29 in unison with the headstock spindle 14. A spring 35 compressed between the inner end of the sleeve 29 and a flange 36 on the shaft 27 normally maintains this shaft in the position shown, in which a head 37 on the shaft abuts the outer end of the sleeve. The sleeve 29 is also connected to the lay-shaft 11 through a gear train 38, 39, 40 and a free-wheel clutch 41 of the wedging-roller type. The wheel 40 is journalled on the shaft 11 and rigid with one element of the clutch 41. The other element of this clutch is keyed to the shaft 11. The gear train is arranged after the manner of the screw-cutting gearing of a lathe and thus provides for any desired variation in ratio; the possible ratios are however such that the highest ratio, in the sense from the lay-shaft to the sleeve 29, is lower than that of the power path through the friction clutch. The freewheel clutch 41 prevents the wheel 40 from overrunning the shaft 11 in the forward direction. The arrangement is therefore such that the chain gearing 33, operating through the friction clutch, tends to drive the sleeve 29 at headstock-spindle speed, the gear train 38, 39, 40 causes the clutch to slip and limits the speed to any selected value, and the sleeve can be instantaneously stopped on application of the brake 31, whereupon the free-wheel 41 overruns and the slip in the friction clutch rises to 100%.

The helix wire 42 is fed from a spool (not shown) over a non-travelling guide pulley 43 into the nicks cut in the support wires 17 by a knife 44, and the nicks are thereafter swaged over by a tool 45 in order to lock the helix wire in them. The knife and swaging tool are mounted respectively on two levers 46 and 47, conveniently pivoted on the lay-shaft 11 and actuated by cams 48 and 49 on a cam-shaft 50, the cams serving to move the tools 44 and 45 from their operative to their inoperative positions as required. The cam-shaft is driven by a pawl 51 mounted on an eccentric 52 on the lay-shaft 11 and engaging a ratchet wheel 53 on the cam-shaft. A cam 54 on the cam-shaft actuates a switch 55 which controls the brake solenoid 32. The cam-shaft rotates exactly one revolution while the gripper travels a distance equal to the length of a helix plus the length of an interval between helixes.

As an example of operation of the machine, it will be assumed that the lead-screw pitch is 0.200 in. and that the gear wheel 38 on the sleeve has 50 teeth while the gear wheel on the lay-shaft has 49 teeth. While the brake 31 is off, the sleeve 29 and the lead-screw 26 are driven through the friction clutch, but their speed is limited by the free-wheel 41 and gear train 38, 39, 40 to 49—50 of headstock-spindle speed. The differential speed of the nut 25 and the lead-screw 26 is therefore 1 revolution in 50 of the spindle 14, so that the gripper is moved $0.200 \times \frac{1}{50}$ in. per revolution of the spindle. The length of each individual helix and of the intervals between helixes can be readily varied by varying the effective dwell of the brake-actuating cam 54, e. g. by adjustment of a cam-follower (not shown), and the speed of the cam-shaft relative to spindle speed.

When it is desired to wind helixes of non-uniform pitch, the lead-screw 26 is reciprocated longitudinally with respect to the sleeve 29 by a cam-follower lever 56 engaging the flange 36 and operated by a cam 57 of suitable profile on the cam-shaft 50. The longitudinal movement of the lead-screw is superimposed on the basic pitch of the helix and recovered in the intervals between helixes; and alterations may be made in this cam without affecting the basic pitch or the length of the intervals. The lever 56 may be pivoted on an eccentrically mounted pin 58 which can be rocked by a handle 59 in order to bring the cam 57 into and out of operation.

Figure 3:
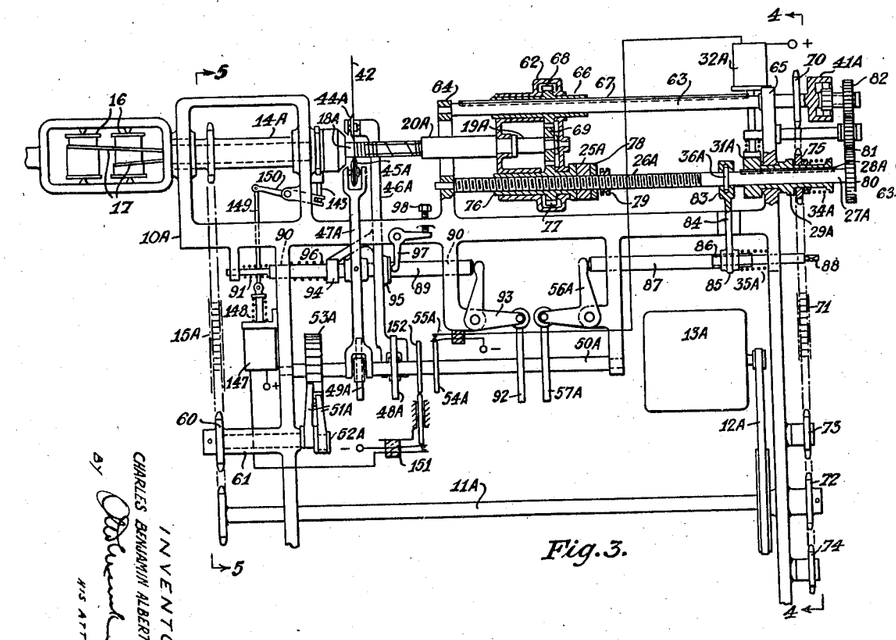
Fig. 3 is a similar elevation of a preferred embodiment.
Figures 4, 5:
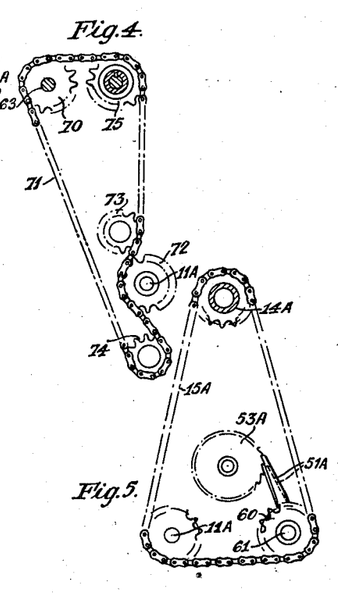
Figs. 4 and 5 are end elevations of chain transmissions taken on the lines 4—4 and 5—5 respectively in Fig. 3.
Figure 6:
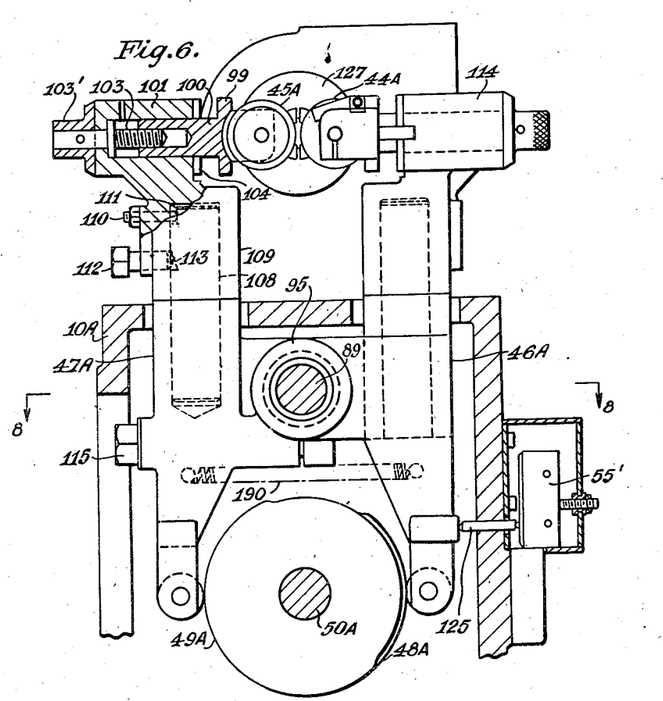
Fig. 6 is a detailed sectional end elevation to a larger scale of means for supporting and actuating the nicking and swaging tools, taken looking towards the headstock end of Fig. 3.
Figure 7:
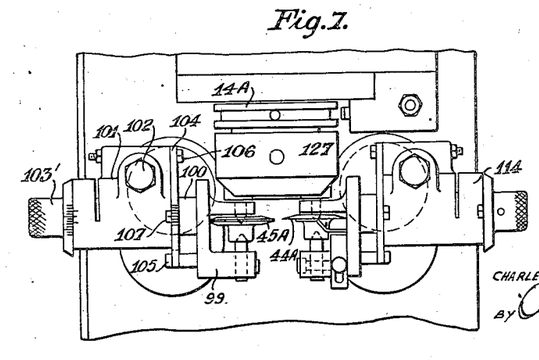
Fig. 7 is a plan of the parts shown in Fig. 6.

In Fig. 3, which shows a preferred embodiment of the invention, parts corresponding or equivalent in function to those hereinbefore described with reference to Fig. 2, are denoted by the same reference numerals respectively, with the addition of reference letter A. For convenience in illustration, the various shafts are displayed in developed view in Fig. 3; Figs. 4 and 5 show their actual relative positions.

The layshaft 11A drives the headstock spindle 14A by a triangular chain drive 15A which includes a sprocket 60 fast on an eccentric shaft 61 provided with a pair of eccentrics 52A operating a pair of pawls 51A which drive the ratchet wheel 53A fast on the cam-shaft 50A.

The gripper shaft 19A is journalled in a carriage 62 which is supported by the lead-screw shaft 27A and a shaft 63 rotatable in fixed bearing members 64 and 65. One end of the lead-screw shaft 27A is supported in the bearing member 64, and near its other end it passes through the sleeve 29A which is rotatable in the bearing member 65 but prevented from sliding. The shaft 27A can be slid through a limited distance and is drivably connected to the sleeve 29A by the key 28A. A sleeve 66 is rotatable in bearings in the carriage 62 and slides on the shaft 63, being constrained to rotate with this shaft by a key 67. A gear-wheel 68 rigid with the sleeve 66 is in constant mesh with a gear-wheel 69 rigid with the gripper shaft 19A. A chain sprocket 70 fast on the shaft 63 is connected by a chain 71 to a sprocket 72 fast on the lay-shaft 11A. This chain transmission also includes two idler sprockets 73 and 74 and a friction clutch driving sprocket 75. This chain gear and the carriage gears 68 and 69 constrain the gripper 20A to rotate in unison with the headstock spindle 14A.

A sleeve 76 is rotatable but not slidable in the carriage 62 and surrounds a part of the lead screw 26A. A gear-wheel 77 driving the sleeve 76 is in constant mesh with the gear-wheel 69. The sleeve 76 is rigid with a body 78 in which are two half nuts 25A radially slidable into and out of engagement with the lead screw 26A under control of a striking ring 79.

A gear wheel 80 fast on the lead-screw shaft 27A is drivably connected through an idler wheel 81 with a gear wheel 82 rotatable on the end of the shaft 63 and connected to this shaft by the free-wheel clutch 41A. The gear train 80, 81, 82 is so arranged that the ratio provided between the shafts 27A and 63 can be easily varied by changing the gear wheels or otherwise. The size of the sprocket 75 that is frictionally mounted on the sleeve 29A is such that the friction clutch tends to drive the lead screw 26A at the same speed as the carriage sleeve 76 is driven through the carriage gear-wheel train 68, 69, 77, the shaft 63 and the sprocket 70; the ratio of the gear-wheel train 80, 81, 82 is such that the free-wheel clutch 41A will operate to reduce the speed of the lead screw and thus cause the carriage to be fed slowly to the right when the nut 25A is engaged and the brake 31A is released.

It will therefore be evident that this screw-and-nut differential gear has its input element 76 connected to the common driving member 11A by the transmission path 72, 71, 70, 63, 68, 69 and 77, while its input element 29A is connected to the common driving member 11A by two transmission paths in parallel, one of these paths being 72, 71, 75 and the other 72, 71, 70, 41A, 82, 81, 80, 27A. The output movement of the differential gear is the longitudinal sliding of the carriage and gripper, which is fast or slow according as the brake 31A is applied or released. The general mode of operation is accordingly the same as that of the example shown in Fig. 2, but the over-all length of the machine, relative to the length of work-piece, is substantially reduced.

The lead-screw shaft 27A is located in the axial direction by a bidirectional thrust bearing 36A, 83 which connects this shaft to an arm 84 having at its lower end a nut 85 engaged on a screw 86 formed on a shaft 87 slidable in bearings in the frame 10A. The shaft 87 is urged to the left by the compression spring 35A and can be displaced to the right by the cam-follower lever 56A so as to superimpose on the movement of the carriage, due to the differential gear, a movement varying the pitch of the helix being wound by the machine. The shaft 87 can be rotated by a tool applied to its end 88 for the purpose of giving a fine adjustment to the position of the carriage. The range of longitudinal movement of the lead-screw shaft is insufficient to cause the gear-wheel 80 to slide completely out of mesh with the gear-wheel 81.

When a helix of varying pitch is being wound, it is necessary to displace the swaging tool longitudinally with respect to the nicking knife in such a manner that the longitudinal interval between the two is kept equal to one-half of the pitch of the last turn of the helix. Means for obtaining this result are shown diagrammatically in Fig. 3. The lever 47A that carries the swaging tool is rigid with a shaft 89 slidable in bearings 90 in the frame. A compression spring 91 urges this shaft to the right, and a cam 92 fast on the cam-shaft 50A operates through a bell-crank cam-follower lever 93 to impart to the shaft 89 and the swaging tool 45A the necessary cyclical displacement. The cam-follower lever 46A that carries the nicking knife is mounted on the shaft 89 by means of two bearings 94 and 95 and is both slidable and rotatable on this shaft. A compression spring 96 urges the lever 46A to the right, and this lever is located by a bell-crank lever 97 one arm of which engages the bearing 95 and the other arm of which reacts against an adjusting screw 98. This screw enables the knife 44A to be adjusted longitudinally of the machine.

A preferred practical design of the means for controlling the nicking and swaging tools is shown in Figs. 6, 7, 8 and 9. The swaging tool 45A (Figs. 6 and 7) is rotatable on pivot bearings in a bracket 99 having a cylindrical shank 100. This shank is normally clamped fast in a lever head 101 by means of a pinch screw 102. When the pinch screw 102 is slackened, the bracket 99 can be adjusted both transversely with respect to the axis of the headstock spindle 14A by means of a lead screw 103 having a micrometer head 103', and angularly about the axis of the shank 100, in order to suit different helix angles, by means of a plate 104 which has a bearing on the shank 100, which is slidably engaged with a pin 105 rigid with the bracket, and which can be locked in various angular positions about the axis of the shank 100 by a bolt 106 engaging the head 101. A vernier scale of angle 107 is provided between the plate 104 and the head 101. The lever 47A is provided with an upwardly directed cylindrical pin 108 engaged in a socket portion 109 of the head 101. A screw 110 in the socket portion 109 co-operates with a groove 111 on the pin 108 to maintain the axis of the tool 45A parallel to the headstock axis, and a screw 112 co-operates with an inclined notch 113 in the pin 108 to lock the lever head 101 tightly down against the upper end of the lower proper. The lever 46A carries the nicking tool 44A by the agency of a similar lever head 114. This construction facilitates renewal of a nicking or swaging tool, if necessary, while a work-piece is still in position and partly wound. A tension spring 190 connecting the levers 46A and 47A constrains them to follow their respective cams 48A and 49A.

Figure 8:
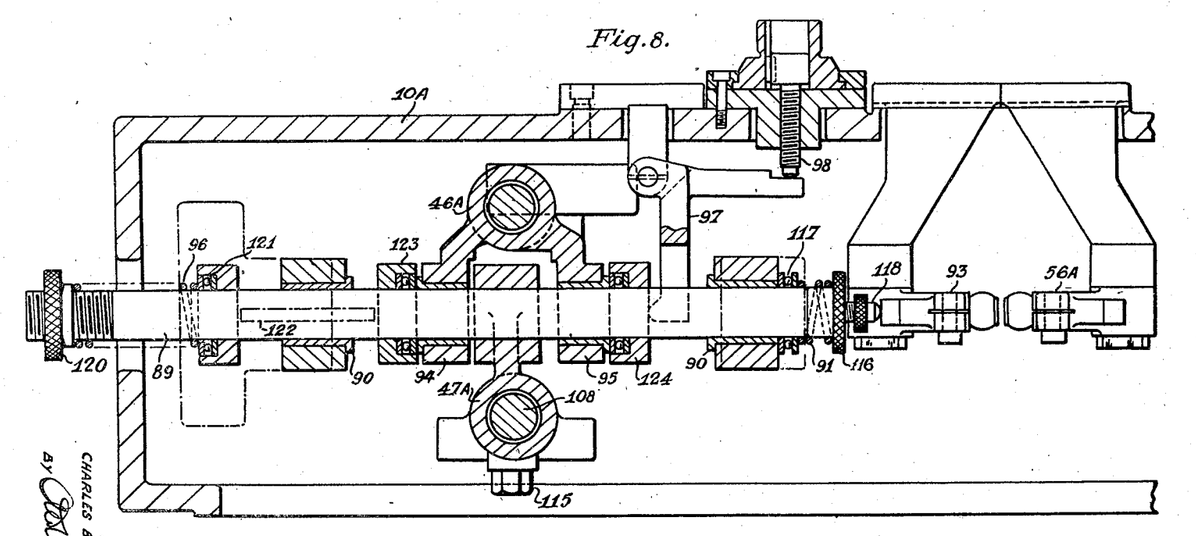
Fig. 8 is a sectional plan, taken on the line 8—8 in Fig. 6.
Figure 9:
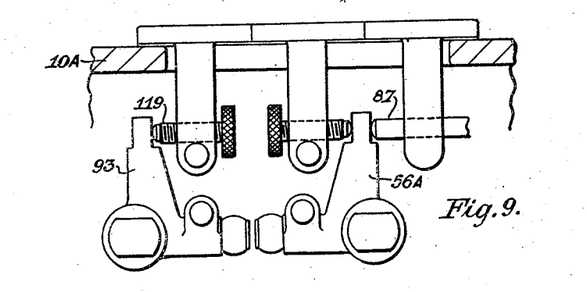
Fig. 9 is a front elevation of parts seen at the righthand end of Fig. 8.

The lever 47A is clamped by a pinch bolt 115 to the shaft 89, which is slidable and rotatable in the fixed bearings 90 (Fig. 8). The spring 91 is compressed between a head 116 on the shaft 89 and a thrust bearing 117 reacting against one of the bearings 90, so that the shaft 89 and the lever 47A are urged to the right. An adjustable tappet 118 on the right-hand end of the shaft 89 engages the follower lever 93 of the cam 92. The limiting position of this cam-follower lever is determined by a screw stop 119 (Fig. 9).

The lever 46A that carries the nicking tool has, as already described with reference to Fig. 3, two bearings 94 and 95 rotatable and slidable on the shaft 89. This lever is urged to the right, relatively to the lever 47A, by the spring 96 which is compressed between a nut 120 on the shaft 89 and a thrust bearing 121 which reacts, through pins such as 122, slidable through the housing of the bearing 90, and another thrust bearing 123 against the lever bearing 94. The lever 46A is longitudinally located by the adjusting screw 98 which sets the bell-crank lever 97. A thrust bearing 124 is interposed between the lever 97 and the bearing 95.

The lever 46A may be arranged to actuate a tappet 125 (Fig. 6) which in turn actuates a switch 55'. This switch replaces the switch 55A in Fig. 3 and the arrangement enables the separate switch-actuating cam 54A to be omitted.

Figures 1, 10, 11:
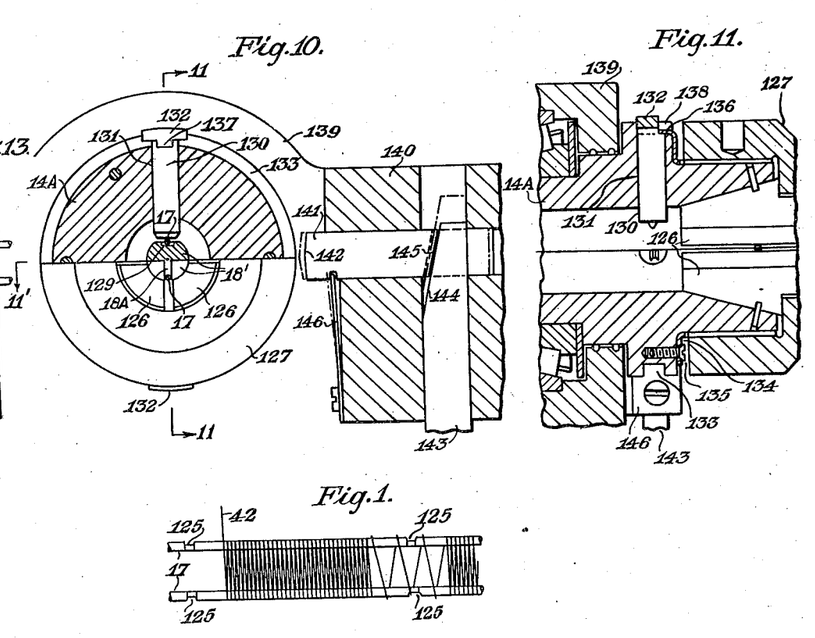
Fig. 1 is an elevation of a portion of one form of work-piece, which the said embodiments are adapted to make.
Fig. 10 is an end elevation of the headstock of the machine shown in Fig. 3, the upper half being in section on the line 10—10 in Fig. 12.
Fig. 11 is a sectional elevation taken generally on the line 11—11 in Fig. 10, but with the spindle nose in section on the line 11—11' in Fig. 10.
Figures 12, 13:
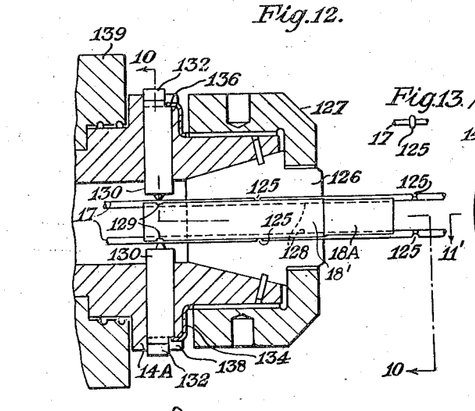
Fig. 12 is a section of the headstock spindle nose, taken on the vertical plane through the headstock axis.
Fig. 13 is a plan of a deformation of a support.

The means for making the wing deformations 125 (Fig. 1) in the supports 17 are shown in Figs. 10, 11 and 12. The former 18A is omitted from Fig. 11. The nose of the headstock spindle 14A is fitted with a collet chuck consisting of a four-segment collet 126 and a flanged actuating nut 127. The former 18A (Figs. 10 and 12) has a cylindrical shank 18' provided with diametrically opposed longitudinal grooves 128 accommodating the supports and each interrupted by a wing-forming recess 129. A pair of wing-forming punches 130 are slidable in radial bores 131 in the spindle head and are provided with heads 132 of rectangular section located in a groove 133 in the spindle nose, so that the punches are prevented from rotating in the bores 131. A washer 134 is fixed by screws such as 135 to the spindle nose and is provided with tongues such as 136 which are bent over to engage in stepped parts 137 of the punch heads and so limit their outward movement, these tongues passing through notches such as 138 in the spindle nose.

A headstock bearing housing 139 is provided with a lateral extension 140 in which is slidable a striker bar 141 between the retracted position shown in full lines and an extended position which is shown in chain-dotted lines and which is such that the bevelled end 142 of the bar will strike the punch heads 132 as the headstock spindle rotates and so cause the punches 130 to indent the supports 17. The bar 141 is moved to its extended position by a vertically slidable cam member 143 having a bevelled end 144 co-operating with a bevelled step 145 on the bar 141 which is retracted, when the member 143 is lowered, by a leaf spring 146. Fig. 13 is a plan of an indented portion 125 of one of the supports 17, as seen looking towards the headstock spindle axis. The member 143 is actuated by a solenoid 147 biased by a compression spring 148 and connected by a link 149 and a lever 150 to the member 143. The solenoid 147 is momentarily energized, once during each cycle of operation of the cam-shaft 50A, through a switch 151 actuated by a cam 152.

It has hereinbefore been mentioned that, when the length of work-piece being wound in a run of the machine is not an integral multiple of the pitch of the lead screw 26A, it is necessary to make special provision to ensure that the first helix of the series of helixes constituting one completed work-piece has the proper spacing of the first few turns. Means for attaining this object will be described with reference to Figs. 14–18. Figs. 14–17 show a practical design of the carriage illustrated diagrammatically in Fig. 3. Since the same reference numerals are employed to denote the principal parts of the carriage in these figures, the general design shown in Figs. 14–17 will be clear.

Figure 15:
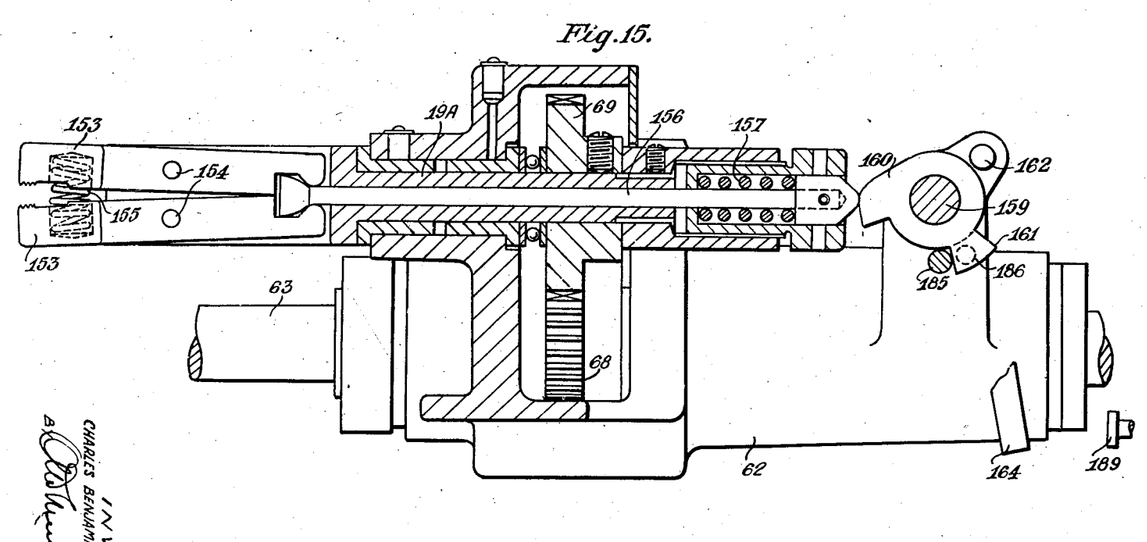
Fig. 15 is a section on the line 15—15 in Fig. 17.

Referring to Fig. 15, the gripper 20A includes two jaw levers 153 pivoted on two pins 154 spanning a longitudinal slot in the gripper shaft 19A. These jaws are urged open by a compression spring 155 and can be closed to grip the supports by movement to the right of a tension rod 156 under the influence of a compression spring 157. A cam 158 pinned on a control shaft 159 has a lobe 160 co-operating with the end of the pull rod 156 and a lug 161. Displacement of the cam in the counter-clockwise direction is limited by a stop pin 162 fast in the carriage body 62 and co-operating with the lug 161.

The control shaft 159 is rotatable in bearings 163 and 163' (Fig. 17) on the carriage body by means of a handle 164 pinned to the shaft. A torsion spring 165 surrounds a part of the shaft 159 and has its ends anchored respectively in the bearing 163' and in a collar 166 pinned to the shaft 159. This spring biases the shaft towards the counter-clockwise limit of its range of movement, as viewed from the handle end.

Figure 14:
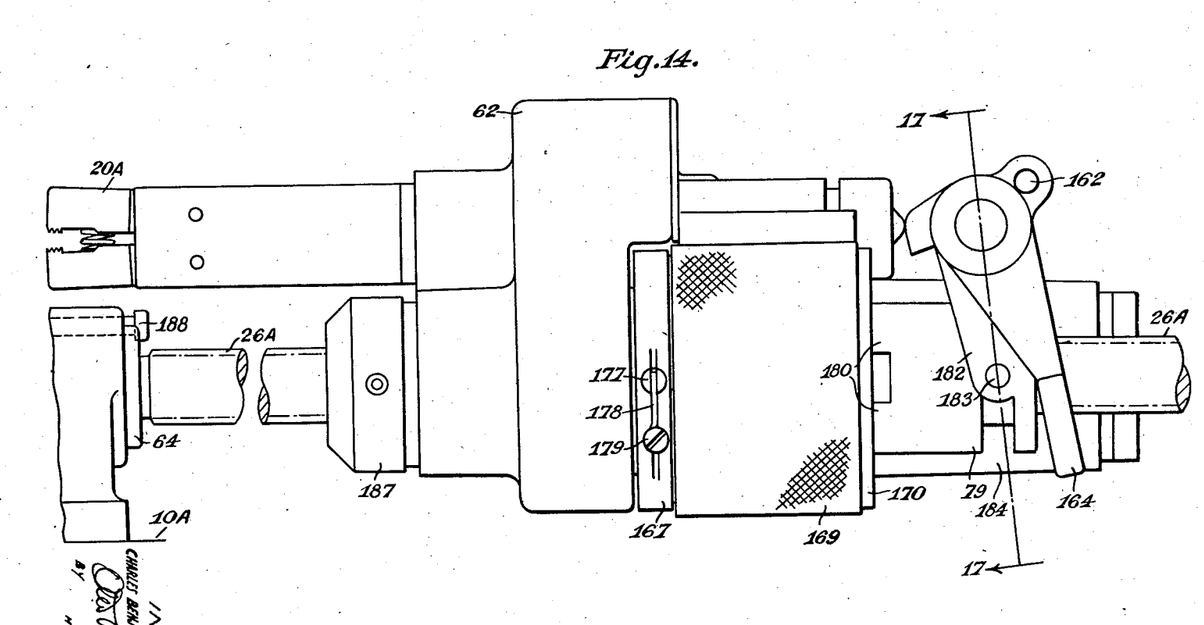
Fig. 14 is a front elevation of a carriage forming part of the machine shown in Fig. 3.
Figure 16:
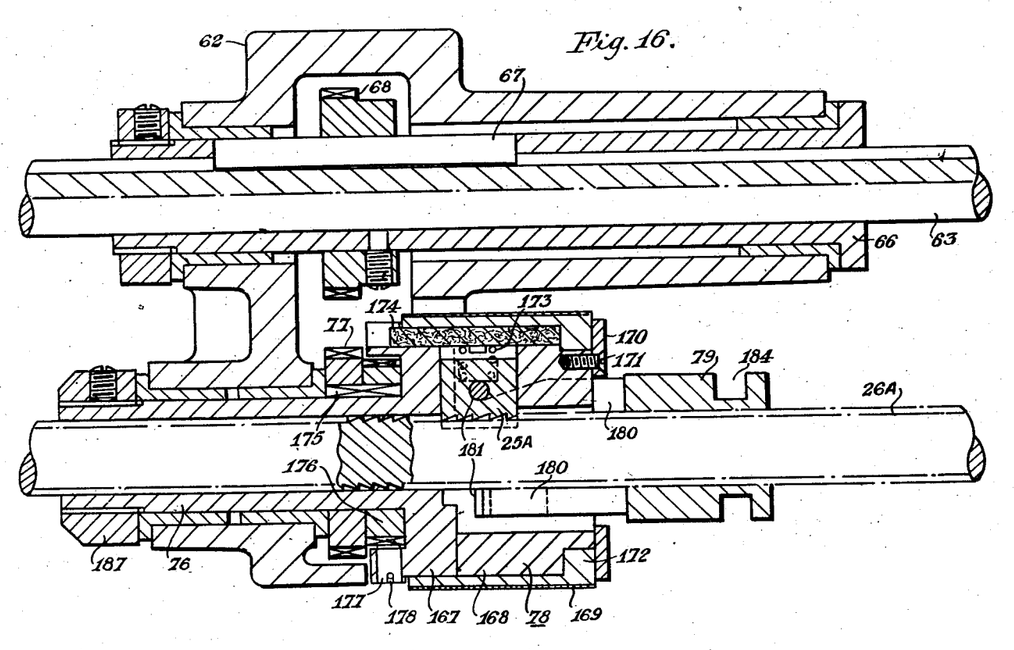
Fig. 16 is a section on the line 16—16' in Fig. 17.
Figure 17:
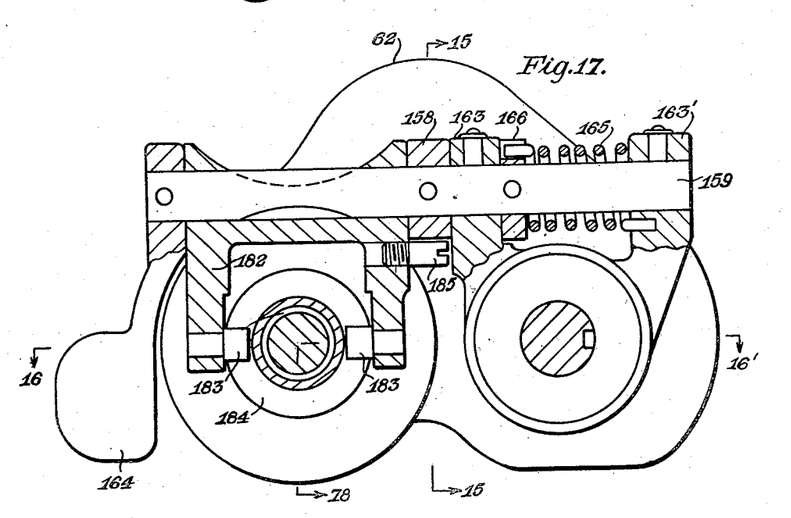
Fig. 17 is a section on the line 17—17 in Fig. 14.
Figure 18:
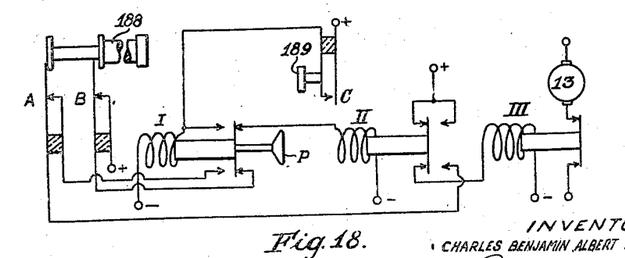
Fig. 18 is an electrical circuit diagram.

The split nut (Fig. 16) includes a nut housing 78 (shown sectioned on the line 16'—78 in Fig. 17). This housing consists of a flange 167 which is integral with the sleeve 76 and a cover portion 168 which is fixed to the flange 167 by screws (not appearing in Fig. 16). A knurled ring 169 is rotatably mounted on the nut housing, being retained by a washer 170 which is secured to the part 168 by screws such as 171; this washer engages an internal flange 172 which is formed on the ring 169 and which surrounds a reduced end of the part 168. Each half nut 25A is guided for radial sliding between the parts 167 and 168 and is urged radially inwards by a compression spring 173 which reacts against a strip 174 of friction material located in a longitudinal groove in the nut body 78 and urged by the spring 173 against the inside of the ring 169 which is thereby frictionally clutched to the nut body. The gear wheel 77 is coupled by a key 175 to a ratchet wheel 176, this wheel cluster being rotatable on the sleeve 76. The ratchet wheel 176 is accommodated in a counterbore in the flange 167 and a pawl 177 radially slidable in this flange co-operates with the ratchet wheel, being urged inwards by a wire cantilever spring 178 held by a screw 179 (Fig. 14). The free-wheel constituted by the ratchet wheel 176 and the pawl 177 normally transmits the drive from the gear wheel 77 to the nut. The striking ring 79 for opening the nut has two diametrically opposed pairs of longitudinal prongs 180 provided with bevelled ends; each pair co-operates with the ends of a pin 181 passing through the corresponding half nut 25A. When the striking ring 79 is moved to the left from the position shown, the pins 181 are caused to ride up the bevelled ends of the prongs 180 and so disengage the half nuts from the lead screw 26A. The striking ring 79 is actuated by a yoke 182 rotatable on the control shaft 159 and having striking pins 183 co-operating with a groove 184 in the striking ring. A pin 185 fast in the yoke 182 co-operates with the lug 161 on the control shaft cam. Movement of the striking ring to the right beyond the position shown in Figs. 14 and 16 is prevented by engagement of the pin 185 with a fixed pin 186 (Fig. 15).

Displacement of the carriage to the left is limited by engagement of a nut 187 on the lead-screw sleeve 76 with the lead-screw bearing 64 (Fig. 14). A switch-operating plunger 188 is slidable in the housing of the bearing 64 and its head normally projects as shown, so that the plunger is depressed as the carriage is stopped against the face of the bearing 64. The plunger 188 operates normally-closed contacts A and B shown in Fig. 18, where I is a relay provided with a push button P and II is a relay controlling a contactor III for the main driving motor 13.

The operation of the machine is as follows. While the machine is running normally, the carriage control handle 164 (Figs. 14 and 17) is at the counter-clockwise limit of its range of movement, the gripper 20A being closed and the half nuts 25A engaged with the lead screw 26A. The electrical control system is in the condition shown in Fig. 18: relay II is energised by a circuit from positive through contacts B, back contacts of relay I and coil of relay II to negative, the motor contactor III being energised by a circuit from positive through front contacts of relay II and coil of contactor III to negative. When the last helix of a series constituting a complete work-piece has been wound, push-button P is pressed, breaking the energising circuit of relay II which releases and causes the motor contactor III to open. A hold-on circuit for relay I is established from positive through back contacts of relay II, contacts A, front contacts of relay I and coil of relay I to negative.

Next the work-piece is separated from the headstock by a guillotine (not shown), and the carriage control lever 164 is urged clockwise to the position shown in Figs. 14 and 15 so that the gripper 20A is opened; the work-piece is then removed. Next the lever 164 is urged more strongly clockwise so as to force the striking ring 79 to the left and open the half nuts 25A. As soon as these half nuts are disengaged from the lead screw 26A, the pressure of the operator's hand on the lever 164 causes the carriage to move to the left until it is stopped by abutting of the nut 187 against the bearing 64. The ends of the supports are now between the jaws of the gripper which close when the handle 164 is released. Depression of the switch plunger 188 opens both contacts A and B (Fig. 18) substantially simultaneously. Opening of contacts A interrupts the hold-on circuit of relay I, which reverts to the condition shown. Relay II remains unoperated, since contacts B are open.

Though the striking ring 79 is now free to slide to the right as the half nuts 25A are urged inwards by their springs, owing to lack of registration between the nut and the lead screw the half nuts will usually not immediately engage. The operator accordingly rotates the knurled ring 169 in the normal direction of rotation of the nut, and the free-wheel 176, 177 allows the sleeve 76 and the nut body 78 to be rotated, as a result of the frictional drag imposed by the strips 174, until the half nuts are fully engaged with the lead screw. On continued rotation of the knurled sleeve, the frictional drag transmits sufficient torque to the half nuts to cause the nut body 78 and the sleeve 76 to begin to move to the right, e. g. to the extent permitted by a slight end play between the sleeve 76 and the carriage body 62. Such axial movement of the sleeve 76 is sufficient to allow contacts B to close while leaving contacts A open. Thereupon the circuit is closed from positive, through contacts B, back contacts of relay I and coil of relay II to negative, relay II operates and the motor contactor III is thereby closed. The machine is thus started on its next run, and, as the carriage begins its traverse, contacts A close, leaving the electrical system in its initial condition. Relay I may be arranged to operate with a short delay, so as to prevent accidental starting of the motor if the carriage is brought against the stop so slowly that contacts A open an appreciable time before contacts B. The carriage may be arranged to operate a switch plunger 189 (Figs. 15 and 18) as it reaches the right-hand end of its run, which closes contacts C and thereby automatically operates relay I.

I claim:
1. Apparatus of the kind specified, for winding a succession of helixes of wire onto at least one longitudinal support to form a series of electrode structures for electron discharge tubes, the apparatus including a hollow headstock spindle, a gripper for drawing a support through said spindle, means constraining said gripper and said spindle to rotate in unison, and means for moving said gripper longitudinally at a cyclically varying speed, characterised in that the last-mentioned means comprise a differential gear having two input elements, a common driving member drivably connected to both of the said input elements, the connection between one of said input elements and said driving member including speed-changing means, and means operatively connected to said driving member for cyclically changing the condition of said speed-changing means.

2. Apparatus as claimed in claim 1, characterized in that said speed-changing means in one condition arrest the said one input element and thereby cause a relatively rapid longitudinal movement of the gripper, and in another condition rotate said one input element in such a manner as to cause a relatively slow longitudinal movement of said gripper.

3. Apparatus as claimed in claim 1, characterized in that the said differential gear has a screw member co-operating with a nut member, and that one of the said input elements is connected to drive one of said differential gear members through said speed-changing means, while the other of said input elements serves to impart uniform rotation to said gripper and to the other of said differential gear members, which is coupled for longitudinal movement with said gripper.

4. Apparatus as claimed in claim 1, characterized in that the said speed-changing means include two parallel power paths between the said common driving member and the said one input element, and a brake operable for arresting the said one input element, the first of said power paths including a slipable driving connection, while the second of said power paths, which has a lower-speed ratio than said first power path, includes a free-wheel arranged to limit the speed of the said one input element to the value determined by the ratio of said second power path and to over-run when said brake is applied, said second power path being so arranged that its ratio can be varied.

5. Apparatus as claimed in claim 1, characterized in that the said differential gear has a screw member co-operating with a nut member, that one of the said input elements is connected to drive one of said differential gear members through said speed-changing means, while the other of said input elements serves to impart uniform rotation to said gripper and to the other of said differential gear members, which is coupled for longitudinal movement with said gripper, and that the said speed-changing means include two parallel power paths between the said common driving member and the said one input element and a brake operable for arresting the said one input element, the first of said power paths including a slipable driving connection while the second of said power paths, which has a lower-speed ratio than said first power path, includes a free-wheel arranged to limit the speed of the said one input element to the value determined by the ratio of said second power path and to over-run when said brake is applied, said second power path being so arranged that its ratio can be varied.

6. Apparatus as claimed in claim 1, characterized in that the said differential gear has a screw member co-operating with a nut member, that one of the said input elements is connected to drive one of said differential gear members through said speed-changing means, while the other of said input elements serves to impart uniform rotation to said gripper and to the other of said differential gear members, which is coupled for longitudinal movement with said gripper, and that said one differential gear member is longitudinally displaceable, under the control of a cam driven by said common driving member, such displacement occurring, when desired, cyclically and serving to produce helixes of non-uniform pitch.

7. Apparatus as claimed in claim 1, characterized by a constant-speed shaft rotatable at a constant ratio with said headstock spindle, a carriage slidable longitudinally with respect to the said headstock spindle along a lead-screw, the said gripper being journalled in said carriage, and the said speed-changing means connecting said lead-screw to said common driving means, a sleeve journalled in said carriage and penetrated by said lead screw, gearing in said carriage drivably connecting said sleeve, said gripper and said constant-speed shaft, and a nut on said sleeve engageable with said lead screw.

8. Apparatus as claimed in claim 1, for winding non-uniform helixes, characterized by a constant-speed shaft rotatable at a constant ratio with said headstock spindle, a carriage slidable longitudinally with respect to the said headstock spindle along a lead-screw, the said gripper being journalled in said carriage, and the said speed-changing means connecting said lead-screw to said common driving means, a sleeve journalled in said carriage and penetrated by said lead screw, gearing in said carriage drivably connecting said sleeve, said gripper and said constant-speed shaft, a nut on said sleeve engageable with said lead screw, a cam operated by said common driving member, and means actuated by said cam for cyclically varying the location of said lead-screw longitudinally with respect to said headstock spindle.

9. Apparatus as claimed in claim 1, characterized by a constant-speed shaft rotatable at a constant ratio with said headstock spindle, a carriage slidable longitudinally with respect to the said headstock spindle along a lead-screw, the said gripper being journalled in said carriage, a sleeve journalled in said carriage and penetrated by said lead screw, gearing in said carriage drivably connecting said sleeve, said gripper and said constant-speed shaft, a nut on said sleeve engageable with said lead screw, a power path including a friction clutch connecting said common driving member to said lead screw, a power path of constant ratio connecting said common driving member to said constant-speed shaft, a power path including a free-wheel in series with a changeable gear train connecting said lead screw to said constant-speed shaft and a brake operable for arresting said lead screw by causing 100 percent slip of said friction clutch and over-running of said free wheel while said constant-speed shaft continues to rotate.

10. Apparatus of the kind specified, for winding a succession of helixes of wire onto at least one longitudinal support to form a series of electrode structures for electron discharge tubes, the apparatus including a hollow headstock spindle, a gripper for drawing a support through said spindle, and means constraining said gripper and said spindle to rotate in unison, characterized by a constant-speed shaft and a lead screw disposed parallel to the axis of said headstock and rotatable in bearings in the frame of the apparatus, a carriage supported by said shafts, the said gripper being journalled in said carriage, a nut journalled in said carriage and co-operating with said lead screw, a sleeve journalled in said carriage and constrained to rotate with said shaft, gearing in said carriage for drivably connecting said shaft, said gripper and said nut, a common driving member drivably connected to said headstock spindle and to said shaft and a variable-speed transmission connecting said driving member to said lead screw.

11. Apparatus of the kind specified, for winding a succession of helixes of wire onto at least one longitudinal support to form a series of electrode structures for electron discharge tubes, the apparatus including a hollow headstock spindle, a gripper for drawing a support through said spindle, means constraining said gripper and said spindle to rotate in unison and for displacing said gripper relatively to said spindle alternatively at relatively slow and fast speeds, two tools serving respectively for nicking and swaging said support, two levers carrying said tools respectively, and cam mechanism for cyclically displacing said levers so as to maintain said tools in and out of operative positions during the times of such slow and fast displacements respectively, said nicking tool being a disk rotatable about an axis perpendicular to a line radial with respect to the axis of said headstock spindle, characterised in that said disc is journalled in a holder so mounted in the appropriate one of said levers as to be angularly adjustable about said radial line.

12. Apparatus of the kind specified, for winding a succession of non-uniform helixes of wire onto at least one longitudinal support to form a series of electrode structures for electron discharge tubes, the apparatus including a hollow headstock spindle, a gripper for drawing a support through said spindle, means constraining said gripper and said spindle to rotate in unison and for displacing said gripper relatively to said spindle alternatively at a speed which is relatively slow and non-uniform and at a relatively fast speed, two tools serving respectively for nicking and swaging said support, two levers carrying said tools respectively, and cam mechanism for cyclically displacing said levers so as to maintain said tools in and out of operative positions during the times of such slow and fast displacements respectively, characterized in that the one of the said two levers that carries said swaging tool is rigid with a pivot shaft parallel to said headstock spindle and capable of rocking and sliding relatively to said headstock, the other of said two levers is slidably and rockably mounted on said pivot shaft, adjusting means are provided for axially locating said other lever, and said pivot shaft is axially located by a cam of said cam mechanism, said cam having a shape such as to adjust the longitudinal spacing of said tools as is necessary to accommodate the variation in pitch of the helix.

13. Apparatus of the kind specified, for winding a succession of helixes of wire onto at least one longitudinal support to form a series of electrode structures for electron discharge tubes, the apparatus including a hollow headstock spindle, a gripper for drawing a support through said spindle and means constraining said gripper and said spindle to rotate in unison, characterized by a constant-speed shaft and a lead screw disposed parallel to the axis of said headstock, a carriage in which said gripper is journalled, a sleeve journalled in said carriage, said sleeve embracing and being constrained to rotate with said shaft, a nut body journalled in said carriage and surrounding said lead screw, gearing in said carriage drivably connecting said shaft, said gripper and said nut body, a nut element displaceable in said nut body between an inoperative position and an operative portion in which it meshes with said lead screw, a striking member for so displacing said nut element, and a common control member for said gripper and said nut element and serving on continued operation in the same sense firstly to open said gripper and thereafter to displace said nut element to its inoperative position.

14. Apparatus as claimed in claim 13, characterized in that said common control member is so mounted on said carriage that, when it is operated in the said sense, continued pressure of the operator's hand on the control member will serve to index said carriage back to its starting position after displacement of said nut element to its inoperative position.

15. Apparatus of the kind specified, for winding a succession of helixes of wire onto at least one longitudinal support to form a series of electrode structures for electron discharge tubes, the apparatus including a common driving member, a hollow headstock spindle, a gripper for drawing a support through said spindle, a disengageable screw-and-nut gear for imparting longitudinal displacement to said gripper, means drivably connecting said spindle and said gripper for rotation in unison by said driving member, a variable-speed transmission connecting said screw-and-nut gear to said driving member, a cam-shaft drivably connected to said driving member and actuating cam mechanism for cyclically changing the condition of said variable-speed transmission so as to cause said gripper to be displaced alternatively at slow and fast speeds, and a clutch which serves, after indexing displacement of said gripper back to its starting position, to permit such rotation of an element of said screw-and-nut gearing as is necessary to bring it into register for re-engagement, independently of rotation of said cam-shaft.

16. Apparatus as claimed in claim 15, including means for starting and stopping said driving member, and means responsive to re-engagement of said screw-and-nut gearing for delaying starting of said driving member until such re-engagement has occurred.

17. Apparatus as claimed in claim 15, including means for starting and stopping said driving member, and means for automatically restarting said driving member in response to re-engagement of said screw-and-nut gearing.

18. Apparatus of the kind specified, for winding a succession of helixes of wire onto at least one longitudinal support to form a series of electrode structures for electron discharge tubes, the apparatus including a common driving member, a hollow headstock spindle, a gripper displaceable for drawing a support through said spindle, a lead screw, a nut constrained to be displaced with said gripper and disengageably coupled to said lead screw, power transmission means drivably connected to said driving member for constraining said spindle and said gripper to rotate in unison and for imparting a rotation to said nut, a variable-speed transmission connecting said driving member to said lead screw, and cam mechanism drivably connected to said driving member for cyclically changing the condition of said variable-speed transmission, said power transmission means including a free-wheel clutch for permitting said nut to be rotated independently for the purpose of bringing it into register for re-engagement with said lead screw after indexing displacement of said gripper back to its starting position.

19. Apparatus of the kind specified, for winding a succession of helixes of wire onto at least one longitudinal support to form a series of electrode structures for electron discharge tubes, the apparatus including a driving member, a hollow headstock spindle drivably connected to said driving member, a lead screw and a shaft parallel to the axis of said spindle, a carriage slidable along said lead screw and said shaft, a gripper co-axial with said spindle and journalled in said carriage, a power transmission path connecting said driving member to said shaft, a nut body in said carriage surrounding said lead screw and carrying a nut element disengageable from said lead screw, gearing in said carriage connecting said shaft, said gripper and said nut body and serving to rotate said gripper in unison with said spindle, said gearing including a free-wheel permitting said nut body to be rotated in its forward direction when said shaft and said gripper are at rest, a change-speed transmission connecting said driving member to said lead screw, cam mechanism driven by said driving member for cyclically changing the condition of said change-speed transmission, an indexing stop for limiting displacement of said carriage towards said headstock, and control means operable for stopping said driving member and for restarting it, when said carriage is indexed by said stop, in response to re-engagement of said nut with said lead screw effected by forward rotation of said nut permitted by said free-wheel.

20. Apparatus of the kind specified, for winding a succession of helixes of wire onto at least one longitudinal support to form a series of electrode structures for electron discharge tubes, the apparatus including a former, means for feeding said support longitudinally over said former alternately at relatively slow and fast speeds, means for feeding a helix wire to said former, driving means for causing relative rotation between said former and said wire-feeding means and thereby applying to said support a succession of relatively closely pitched wire helixes spaced from one another by intervals occupied by coarsely pitched turns, characterised by a tool co-operating with said former for forming on said support wings capable of locating the electrode structure in an electrode assembly into which it is required to be incorporated, and means including a cam operated by said driving means for actuating said tool to deform said support at points coming within each of said intervals, said tool being inoperative on the parts of said support to be occupied by said closely pitched helixes.

21. Apparatus as claimed in claim 20, wherein said former has a longitudinal groove for said support, characterised in that said former has a wing-forming recess opening out of said groove, and that said tool is a wing-forming punch movable substantially radially with respect to said former and co-operating with said recess to deform the support.

CHARLES BENJAMIN ALBERT PORTER.

REFERENCES CITED

The following references are of record in the file of this patent:

UNITED STATES PATENTS

| Number | Name | Date |
|---|---|---|
| 1,897,460 | Anderson et al. | Feb. 14, 1933 |
| 1,970,599 | Franke | Aug. 21, 1934 |
| 1,994,307 | Flaws, Jr. | Mar. 12, 1935 |
| 2,181,288 | Washburn | Nov. 28, 1939 |
| 1,585,905 | Madden et al. | May 25, 1926 |
| 1,814,770 | Schenk et al. | July 14, 1931 |
| 1,874,575 | Morick et al. | Aug. 30, 1932 |